C. M. HOBSON.
COLLAR.
APPLICATION FILED SEPT. 23, 1921.
1,403,956.
Patented Jan. 17, 1922.
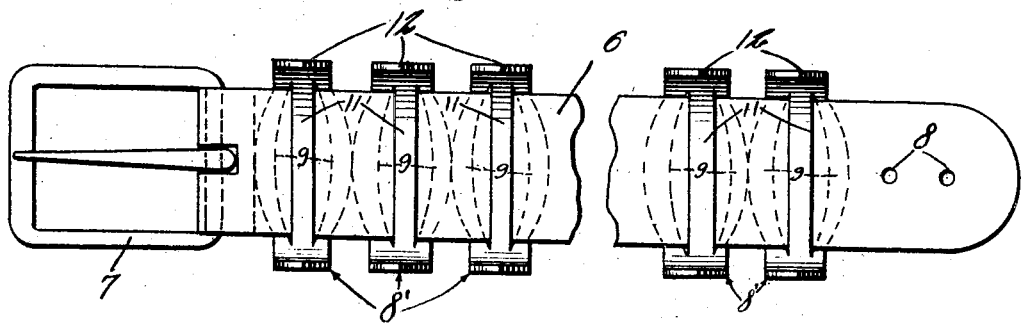
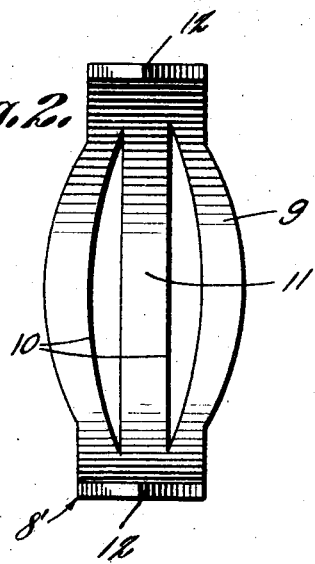
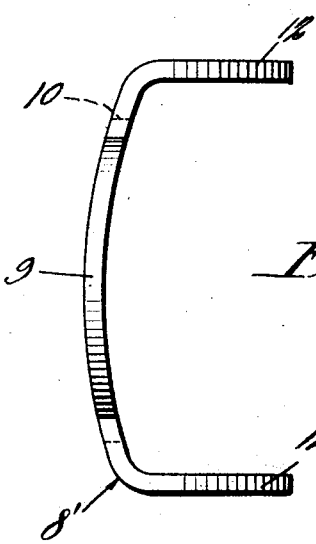
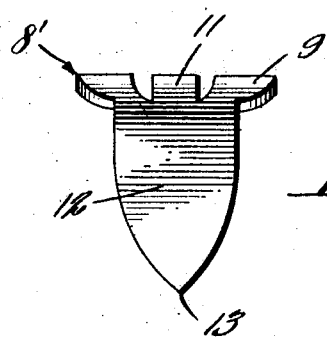
C. M. Hobson,
Inventor.
By C. A. Snow & Co.
Attorneys.

UNITED STATES PATENT OFFICE.

CHARLES M. HOBSON, OF PENN YAN, NEW YORK.

COLLAR.

1,403,956.  Specification of Letters Patent.  Patented Jan. 17, 1922.

Application filed September 23, 1921. Serial No. 502,810.

*To all whom it may concern:*

Be it known that I, CHARLES M. HOBSON, a citizen of the United States, residing at Penn Yan, in the county of Yates and State of New York, have invented a new and useful Collar, of which the following is a specification.

This invention relates to a protecting device for animals such as sheep or the like, the primary object of the invention being to provide a protector in the form of a collar to protect the animal's throat from the attacks of dogs or wild beats.

Another object of the invention is to provide a strap and a plurality of pronged protecting members mounted on the strap, the pronged protecting members lying close to the animal's neck to guard its throat.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is an elevational view of a collar constructed in accordance with the present invention.

Figure 2 is an elevational view of one of the pronged protecting members.

Figure 3 is a side elevational view of one of the protecting elements and Figure 4 is an end elevational view of the same.

Referring to the drawing in detail, the device embodies a support in the form of a strap member 6 which is provided with a buckle 7 at one end thereof, and a plurality of openings 8 at the opposite end, so that the device may be readily and easily secured around the neck of an animal.

Mounted on the strap 6 are the protecting elements 8', each of which embodying a relatively flat body portion 9 formed with a pair of slots 10 to permit the strap to be inserted therein, the slots forming a central bar 11, which is adapted to overlie the strap, when the same is positioned.

Formed integral with the body portion 9 are the spurs or prongs 12, which extend at right angles to the body portion 9 and have their ends pointed as at 13 to provide piercing members. It is to be understood that any number of these protecting devices may be secured to the strap and when the collar is positioned, the prongs 12 extend outwardly from the strap and lie close to the animal's throat wearing the collar.

Thus it will be seen that should a dog or wild beast attack an animal supplied with a collar of this character, the prongs would embed themselves in the mouth of the animal making the attack.

It might be further stated that each of these protecting members is curved as shown by figure 3 of the drawing, so that the same will conform to the curvature of an animal's neck.

Having thus described the invention, what is claimed as new is:—

1. A collar embodying a strap, a plurality of protecting members mounted on the strap, each of said protecting members including right angled end portions, having piercing ends, and means to permit the protecting members to be slid onto the strap.

2. A collar embodying a strap, protecting members removably secured to the strap, each of said protecting members having spaced slots to accommodate the strap, and right angled prongs carried by each protecting member.

In testimony that I claim the foregoing as my own, I have hereto affixed my signature in the presence of two witnesses.

CHARLES M. HOBSON.

Witnesses:
SPENCER F. LINCOLN,
LENA V. GRADY.